(12) United States Patent
Wang et al.

(10) Patent No.: US 9,253,793 B2
(45) Date of Patent: Feb. 2, 2016

(54) CHANNEL AWARE JOB SCHEDULING

(71) Applicant: Intel Corporation, Santa Clara, CA (US)

(72) Inventors: Ren Wang, Portland, OR (US);
Alexander W. Min, Portland, OR (US);
Jr-Shian Tsai, Portland, OR (US);
Tsung-Yuan C. Tai, Portland, OR (US);
Mesut A. Ergin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 13/720,169

(22) Filed: Dec. 19, 2012

(65) Prior Publication Data

US 2014/0169281 A1 Jun. 19, 2014

(51) Int. Cl.
*H04W 4/00* (2009.01)
*H04W 72/12* (2009.01)

(52) U.S. Cl.
CPC .................................. *H04W 72/1226* (2013.01)

(58) Field of Classification Search
CPC ..................................................... H04W 72/00
USPC ................. 370/328–339, 235–238, 401–468; 709/246
See application file for complete search history.

(56) References Cited

U.S. PATENT DOCUMENTS

| | | | |
|---|---|---|---|
| 8,649,265 B2 * | 2/2014 | Song et al. ................. | 370/230.1 |
| 2005/0221869 A1 | 10/2005 | Liu et al. | |
| 2008/0057894 A1 | 3/2008 | Aleksic et al. | |
| 2009/0075652 A1 | 3/2009 | Jung et al. | |
| 2009/0077401 A1 | 3/2009 | Tsai | |
| 2009/0303908 A1 * | 12/2009 | Deb et al. ....................... | 370/310 |
| 2010/0205152 A1 * | 8/2010 | Ansari et al. .................. | 707/654 |
| 2011/0069649 A1 | 3/2011 | Gobriel et al. | |
| 2014/0140213 A1 * | 5/2014 | Raleigh et al. ................ | 370/235 |

FOREIGN PATENT DOCUMENTS

CN 102026287 A 4/2011

OTHER PUBLICATIONS

Chen et al. "M-PSM: Mobility-Aware Power Save Mode for IEEE 802.11 WLANs," Distributed Computing Systems (ICDCS), 2011 31st International Conference, Jun. 20-24, 2011, pp. 77-86.
Judd et al. "Efficient Channel-aware Rate Adaptation in Dynamic Environments," MobiSys '08, Jun. 17-20, 2008, 14 pages.
Qiao et al. "Adaptive Transmit Power Control in IEEE 802.11a Wireless LANs," Vehicular Technology Conference, 2003. VTC 2003-Spring. The 57th IEEE Semiannual, Apr. 22-25, 2003, pp. 433-437.
International Search Report and Written Opinion Received for PCT Patent Application No. PCT/US2013/047242, mailed on Oct. 16, 2013, 12 pages.
Search Report for Taiwanese Patent Application No. 102141917, dated Apr. 22, 2015, 2 pages, including 1 page of English translation.

* cited by examiner

*Primary Examiner* — Iqbal Zaidi
(74) *Attorney, Agent, or Firm* — Jordan IP Law, LLC

(57) ABSTRACT

Methods and systems may provide for determining quality of service (QoS) information for a job associated with an application, and determining a condition prediction for a wireless channel of a mobile platform. Additionally, the job may be scheduled for communication over the wireless channel based at least in part on the QoS information and the condition prediction. In one example, scheduling the job includes imposing a delay in the communication if the condition prediction indicates that a throughput of the wireless channel is below a threshold and the delay complies with a latency constraint of the QoS information.

20 Claims, 2 Drawing Sheets

CHANNEL AWARE JOB SCHEDULING

BACKGROUND

1. Technical Field

Embodiments generally relate to power management in computing platforms. More particularly, embodiments relate to channel aware job scheduling to improve energy efficiency.

2. Discussion

In wireless environments, many factors may contribute to the condition of wireless channels. For example, co-channel interference, channel access contention between neighboring platforms and channel fading due to user mobility may all have an impact on wireless channel condition. When the channel condition deteriorates, the network interface controller (NIC) of a given platform may operate at a higher transmission power in order to compensate for poor conditions. Even with the higher transmission power, the NIC may suffer from lower throughput and frequent retransmissions, which can in turn cause applications running on the platform to complete communication-related jobs in a much longer amount of time. Longer job completion times and application runtimes may delay entry of the platform and/or NIC into low power states, wherein the delayed entry may ultimately result in higher platform energy consumption.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
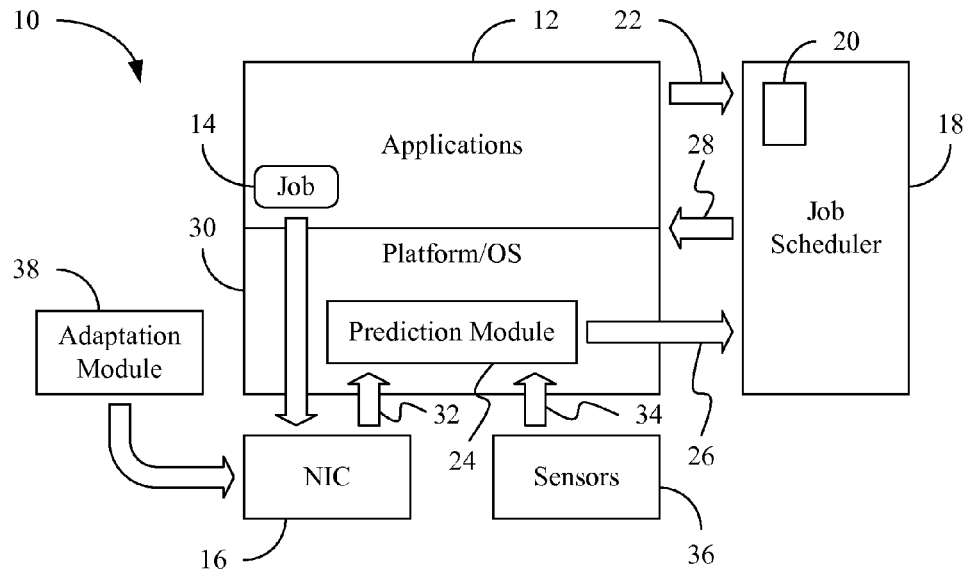
FIG. 1 is a block diagram of an example of a job scheduling architecture according to an embodiment.

FIG. 1 shows a job scheduling architecture 10 in which an application layer 12 generates a job 14 that involves communication over a wireless channel via a network interface controller (NIC) 16. The application layer 12 might include, for example, file synchronization applications, backup applications, periodic email update applications, etc. The job 14 may therefore include the transmission and/or receipt of data, commands, and so forth, wherein a job scheduler 18 may be used to schedule the job 14 for communication over the wireless channel. In the illustrated example, an application interface 20 determines quality of service (QoS) information 22 for the job 14 and a prediction module 24 determines a condition prediction 26 for the wireless channel in question. In general, the scheduler 18 may schedule the job 14 for communication over the wireless channel based at least in part on the QoS information 22 and the condition prediction 26, wherein the scheduling of the job 14 may be achieved by issuing a scheduling decision 28 to the application layer 12 and/or an operating system (OS) 30 associated with the platform.

As will be discussed in greater detail, using the condition prediction 26 to issue the scheduling decision 28 can enable the job scheduler 18 to selectively impose delays so that the job 14 may be completed when the channel condition is relatively good. Of particular note is that delaying the job 14 until channel conditions are relatively good can enable the job 14 to be completed more quickly, which may in turn enable deeper sleep states, greater power conservation and longer battery life. In the illustrated example, the prediction module 24 receives signal information 32 from the NIC 16 and mobility information 34 from one or more sensors 36, wherein the condition prediction 26 is determined based on the mobility information 34 and the signal information 32.

The signal information 32 may include, for example, signal to noise ratio (SNR) information, received signal strength (RSS) information, congestion level information, fluctuation level information and other data that is indicative of actual channel conditions. For example, a relatively low SNR and/or RSS may be indicative of poor channel conditions that may lead to packet losses. Similarly, a relatively high congestion level (e.g., increased number of transmitters/receivers contending for the channel) and/or fluctuation level (e.g., increased variability in channel throughput and/or quality) may be indicative of poor channel conditions.

Additionally, the mobility information 34 may include, for example, accelerometer data, compass data and other data that is indicative of the movement of the platform containing the architecture 10, wherein such motion can impact (e.g., negatively or positively) channel conditions. Thus, the signal information 32 may facilitate a determination of past and current channel conditions, whereas the mobility information 34 may enable inferences to be drawn as to future channel conditions. The prediction module 24 may also use smoothing techniques to filter out short-term oscillations and obtain the condition prediction 26 on an average basis. The condition prediction 26 may therefore constitute a robust assessment of the wireless channel condition that enables the job schedule 18 to make channel aware decisions.

The QoS information 22 may enable the job scheduler 18 to further ensure that certain constraints, such as latency constraints, are satisfied. For example, if the condition prediction 26 indicates that a throughput of the wireless channel is below a particular threshold, a delay can be imposed on the communications associated with the job 14, but any delay imposed can be made to comply with the QoS latency constraint. Indeed, if the job 14 is urgent, the condition prediction 26 could be disregarded altogether, with the job 14 being scheduled for immediate processing. The QoS information 22 may also incorporate prior information based on the type of application associated with the job 14. For example, a backup service or periodic email update type of application might be able to tolerate relatively higher delays without compromising user experience, whereas an online streaming or web browsing application may be less tolerant to latencies due to their time-sensitive and interactive nature.

The illustrated architecture 10 also includes an adaptation module 38 configured to conduct rate adaptation and/or power adaptation for the wireless channel during the communications via the NIC 16. For example, channel-aware rate adaptation solutions may use signal strength measurements collected by wireless cards to help select transmission rates. Moreover, channel reciprocity may be leveraged to obtain channel information, so that the information is available to the transmitter without incurring RTS/CTS (request to send/clear to send) overhead. Additionally, power adaptation solutions might enforce an RTS/CTS frame exchange before each data transmission, and then select the most energy-efficient combination of the PHY (physical layer) mode and transmit power level for subsequent data frame transmissions in order to save energy. Other such "micro-level" rate and/or power adaptation techniques may also be used. The adaptation module 38 may therefore further improve energy efficiency beyond the efficiencies provided by the illustrated prediction module 24 and job scheduler 18.

Figure 2:
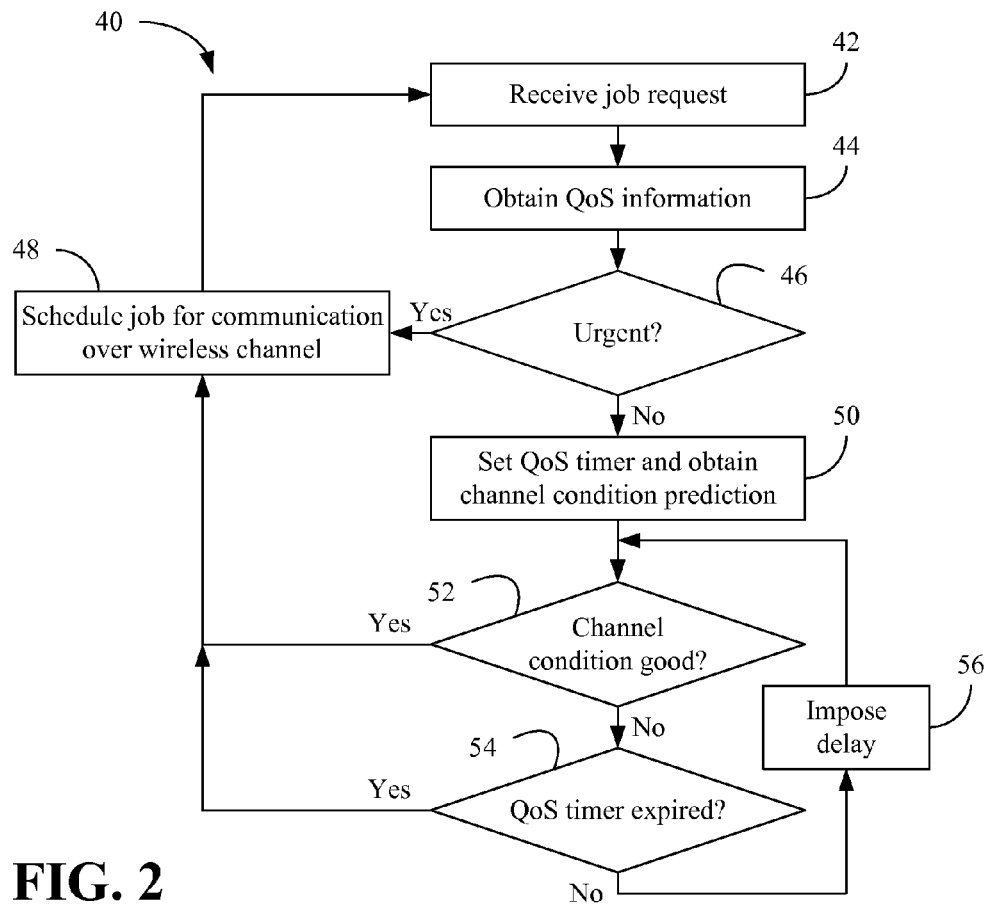
FIG. 2 is a flowchart of an example of a method of scheduling jobs according to an embodiment.

FIG. 2 shows a method 40 of scheduling jobs. The method 40 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 40 may be written in any combination of one or more programming languages, including an object oriented programming language such as Java, Smalltalk, C++ or the like and conventional procedural programming languages, such as the "C" programming language or similar programming languages.

Illustrated processing block 42 provides for receiving a job request, wherein QoS information may be obtained at block 44 for the job request. As already noted, the job request might involve wireless communications (e.g., transmitting and/or receiving) for an application such as a file synchronization application, backup application, periodic email update application, or other "background" application that is able to tolerate delay without having a negative impact on the user experience. A determination may be made at block 46 as to whether the QoS information indicates that the job request is urgent. If so, the job may be immediately scheduled for communication over the wireless channel at block 48, which may also provide for rate and/or power adaptation at a micro-level, as already discussed. Otherwise, illustrated block 50 sets a QoS timer and obtains a channel condition prediction. As already noted, the channel condition prediction may take into consideration a wide variety of factors such as, for example, platform mobility, SNR, RSS, congestion level information, fluctuation level information, and so forth.

A determination may be made at block 52 as to whether the channel condition is relatively good (e.g., throughput of the wireless channel is above a particular threshold). If so, the job may be scheduled for communication over the wireless channel at block 48. Otherwise, illustrated block 54 determines whether the QoS timer has expired. If the QoS timer has expired, the job may be scheduled for communication over the wireless channel at block 48. If the QoS timer has not expired, a delay may be imposed in the job-related communications at block 56. Although not explicitly shown, the communications may also be halted (e.g., in the middle of transmitting and/or receiving) if it is determined that the channel condition has deteriorated, wherein the communications can be re-started when the channel condition improves. Additionally, the illustrated solutions may apply to one or multiple wireless channels depending upon the circumstances (e.g., frequency hopping).

Figure 3:
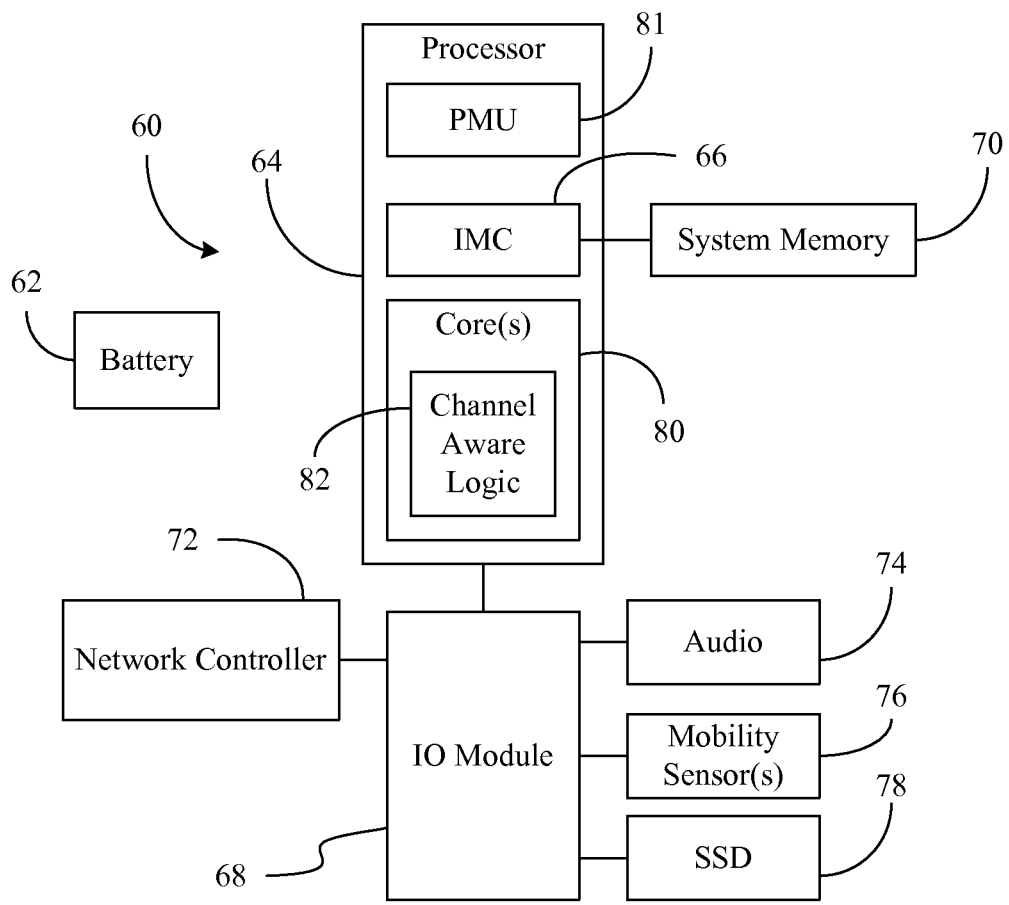
FIG. 3 is a block diagram of an example of a mobile platform according to an embodiment.

Turning now to FIG. 3, a mobile platform 60 is shown. The platform 60 may be part of a mobile device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, the platform 60 includes a battery 62, a processor 64, an integrated memory controller (IMC) 66, an input output (IO) module 68, system memory 70, a network controller (e.g., network interface controller/NIC) 72, an audio IO device 74, one or more mobility sensors (e.g., accelerometers, gyroscopes, compasses) 76 and a solid state disk (SSD) 78. The processor 64, which may include a core region with one or several processor cores 80, may use a power management unit (PMU) 81 to place its cores 80 and other platform components into one or more active states and/or sleep (e.g., low power) states, based on performance and/or power management concerns.

The illustrated IO module 68, sometimes referred to as a Southbridge or South Complex of a chipset, functions as a host controller and communicates with the network controller 72, which could provide off-platform communication functionality for a wide variety of purposes such as, for example, cellular telephone (e.g., W-CDMA (UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and PHY Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 68 may also include one or more wireless hardware circuit blocks to support such functionality. Although the processor 64 and IO module 68 are illustrated as separate blocks, the processor 64 and IO module 68 may be implemented as a system on chip (SoC) on the same semiconductor die.

The illustrated cores 80 of the processor 64 are configured to execute channel aware logic 82 that may determine QoS information for jobs associated with applications executing on the platform 60, determine condition predictions for wireless channels of the platform 60, and schedule the jobs for communication over the wireless channels based at least in part on the QoS information and the condition predictions. In one example, scheduling the jobs includes imposing a delay in the communications if the condition predictions indicate that a throughput of the wireless channels is below a threshold and the delay complies with latency constraints of the QoS information. Thus, the channel aware logic 82 may implement the job scheduler 18 and the prediction module 24 (FIG. 1) for applications such as file synchronization applications, backup applications, periodic email update applications, and other background applications that are able to tolerate delay without compromising the user experience.

Thus, techniques described herein may monitor and predict channel condition at runtime, and schedule file-sync types of applications based on both the channel condition and QoS constraints. Such an approach may be particularly useful for channel conditions that are persistent form more than a few milliseconds (e.g., longer than micro-level adaptation time periods). Moreover, energy savings can be maximized by opportunistically scheduling jobs when channel conditions are relatively good, thus completing the jobs quickly and enabling the platform and/or network controller to enter deeper low power states. Accordingly, platform energy efficiency may be optimized without having a negative impact on user experience. Such a solution may be particularly advantageous in settings where mobile platform users store and retrieve video, music, photos or other content over cloud computing infrastructures and/or local networks.

Embodiments may therefore include a mobile platform having a battery to supply power to the mobile platform, and an application interface to determine QoS information for a job associated with an application. The mobile platform may also have a prediction module to determine a condition prediction for a wireless channel of the mobile platform, and a scheduler to schedule the job for communication over the wireless channel based at least in part on the QoS information and the condition prediction.

Embodiments may also include an apparatus having an application interface to determine QoS information for a job associated with an application, and a prediction module to determine a condition prediction for a wireless channel of a mobile platform. The apparatus may also have a scheduler to schedule the job for communication over the wireless channel based at least in part on the QoS information and the condition prediction.

Embodiments may also involve a method in which QoS information is determined for a job associated with an application, and a condition prediction is determined for a wireless channel of a mobile platform. The method may also provide for scheduling the job for communication over the wireless channel based at least in part on the QoS information and the condition prediction.

Embodiments may also include at least one machine readable storage medium having a set of instructions which, if executed by at least one processor, cause a mobile platform to determine QoS information for a job associated with an application. The instructions, if executed, may also cause the mobile platform to schedule the job for communication over the wireless channel based at least in part on the QoS information and the condition prediction.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A mobile platform comprising:
a battery to supply power to the mobile platform;
an application interface to determine quality of service (QoS) information for a job associated with an application;
a prediction circuit to determine a condition prediction for a wireless channel of the mobile platform;
a scheduler to schedule the job for communication over the wireless channel based at least in part on the QoS information and the condition prediction determined by the prediction circuit; and
a network interface controller, wherein the prediction circuit is to receive signal information that is to include one or more of signal to noise ratio (SNR) information, received signal strength (RSS) information, congestion level information and fluctuation level information from the network interface controller, and wherein the condition prediction is to be determined based at least in part on the signal information.

2. The mobile platform of claim 1, wherein the scheduler is to impose a delay in the communication if the condition prediction indicates that a throughput of the wireless channel is below a threshold and the delay complies with a latency constraint of the QoS information.

3. The mobile platform of claim 1, further including one or more sensors, wherein the prediction circuit is to receive mobility information from at least one of the one or more sensors, and wherein the condition prediction is to be determined base at least in part on the mobility information.

4. The mobile platform of claim 1, wherein the job is to be associated with one or more of a file synchronization application, a backup application and a periodic email update application.

5. The mobile platform of claim 1, further including an adaptation module to conduct one or more of rate adaptation and power adaptation for the wireless channel during the communication.

6. An apparatus comprising:
an application interface to determine quality of service (QoS) information for a job associated with an application;
a prediction circuit to determine a condition prediction for a wireless channel of a mobile platform; and a scheduler to schedule the job for communication over the wireless channel based at least in part on the QoS information and the condition prediction determined by the prediction circuit;

wherein the prediction circuit is to receive signal information that is to include one or more of signal to noise ratio (SNR) information, received signal strength (RSS) information, congestion level information and fluctuation level information from a network interface controller, and wherein the condition prediction is to be determined based at least in part on the signal information.

7. The apparatus of claim 6, wherein the scheduler is to impose a delay in the communication if the condition prediction indicates that a throughput of the wireless channel is below a threshold and the delay complies with a latency constraint of the QoS information.

8. The apparatus of claim 6, wherein the prediction circuit is to receive mobility information from one or more sensors of the mobile platform, wherein the condition prediction is to be determined based at least in part on the mobility information.

9. The apparatus of claim 6, wherein the job is to be associated with one or more of a file synchronization application, a backup application and a periodic email update application.

10. The apparatus of claim 6, further including an adaptation module to conduct one or more of rate adaptation and power adaptation for the wireless channel during the communication.

11. A method comprising:
determining quality of service (QoS) information for a job associated with an application;
determining a condition prediction for a wireless channel of a mobile platform;
scheduling the job for communication over the wireless channel based at least in part on the QoS information and the condition prediction; and
receiving signal information that is to include one or more of signal to noise ratio (SNR) information, received signal strength (RSS) information, congestion level information and fluctuation level information from a network interface controller, wherein the condition prediction is determined based at least in part on the signal information.

12. The method of claim 11, wherein scheduling the job includes imposing a delay in the communication if the condition prediction indicates that a throughput of the wireless channel is below a threshold and the delay complies with a latency constraint of the QoS information.

13. The method of claim 11, further including receiving mobility information from one or more sensors on the mobile platform, wherein the condition prediction is determined based at least in part on the mobility information.

14. The method of claim 11, wherein the job is associated with one or more of a file synchronization application, a backup application and a periodic email update application.

15. The method of claim 11, further including conducting one or more of rate adaptation and power adaptation for the wireless channel during the communication.

16. At least one non-transitory machine readable storage medium comprising a set of instructions which, if executed by at least one processor, cause a mobile platform to:
determine quality of service (QoS) information for a job associated with an application;
determine a condition prediction for a wireless channel of the mobile platform;
schedule the job for communication over the wireless channel based at least in part on the QoS information and the condition prediction; and
receive signal information that is to include one or more of signal to noise ratio (SNR) information, received signal strength (RSS) information, congestion level information and fluctuation level information from a network interface controller, and wherein the condition prediction is determined based at least in part on the signal information.

17. The at least one machine readable storage medium of claim 16, wherein the instructions, if executed, cause the mobile platform to impose a delay in the communication if the condition prediction indicates that a throughput of the wireless channel is below a threshold and the delay complies with a latency constraint of the QoS information.

18. The at least one machine readable storage medium of claim 16, wherein the instructions, if executed, cause the mobile platform to receive mobility information from one or more sensors of the mobile platform, wherein the condition prediction is to be determined based at least in part on the mobility information.

19. The at least one machine readable storage medium of claim 16, wherein the job is to be associated with one or more of a file synchronization application, a backup application and a periodic email update application.

20. The at least one machine readable storage medium of claim 16, wherein the instructions, if executed, further cause the mobile platform to conduct one or more of rate adaptation and power adaptation for the wireless channel during the communication.

* * * * *